Dec. 8, 1959  P. G. GILBERT  2,916,329
WHEEL WITH SHORT SPOKES
Filed July 1, 1957

INVENTOR
Philo G. Gilbert

BY

AGENT

United States Patent Office 2,916,329
Patented Dec. 8, 1959

2,916,329

WHEEL WITH SHORT SPOKES

Philo G. Gilbert, Portland, Oreg.

Application July 1, 1957, Serial No. 669,152

4 Claims. (Cl. 301—55)

This invention relates generally to wheels and more particularly to wheels in which a hub part is connected by a plurality of radially short spoke structures to a rim part concentric with and radially spaced from the hub part.

Reference is here made to my U.S. patent application S.N. 324,984 filed December 9, 1952, now Patent No. 2,805,894 patented September 10, 1957, Wheel With Spokes in Radial Tension, of which this application is a continuation in part.

It is a principal object of this invention to provide an improved wheel with spokes in radial tension.

It is a second object to provide such a wheel having a minimum number of simple parts.

It is a third object to provide such a wheel which will be easy to assemble by a simple method, with a minimum of tools and fixtures in a minimum of time.

It is a fourth object to provide such a wheel which is strong, easy to inspect and has good structural appearance.

How these and other objects are attained is disclosed in the following description referring to the attached drawing in which—

Like numerals of reference refer to like parts in the several figures of the drawing.

Figure 1:
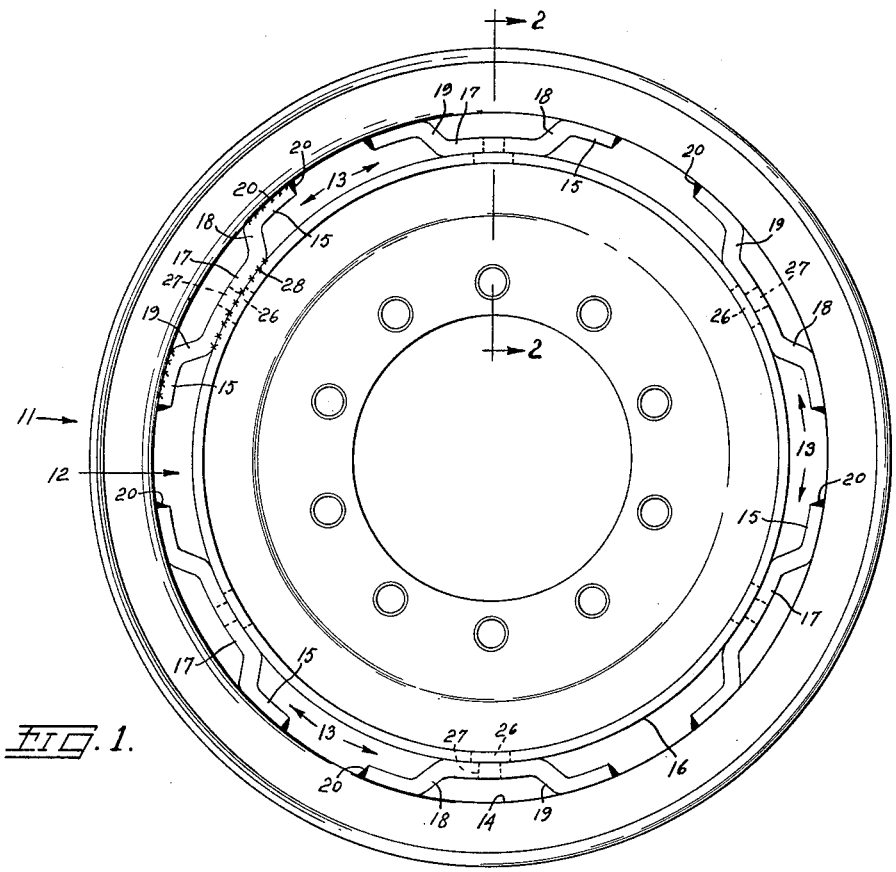
Fig. 1 is a view in side elevation as seen from the inside of a preferred form of one of the wheels of this invention.

As shown in Fig. 1 the disclosed wheel has a rim structure indicated generally by the numeral 11, a hub structure 12 and a plurality of spoke structures 13 welded, as indicated by the series of small crosses, to both structures 11 and 12.

Rim structure 11 is seen to be formed with a cylindrical inner surface 14 to which are formed and welded the outer surfaces of end flanges 15 of spoke structures 13. Hub structure 12 is seen to be formed with a cylindrical outer surface 16 to which are formed and welded the inner surfaces of center sections 17 of spoke structures 13.

End flanges 15 of each spoke structures 13 are connected to the center section 17 thereof by a pair of oppositely angularly positioned spokes 18 and 19 radially offsetting flanges 15 from center section 17.

Figure 2:
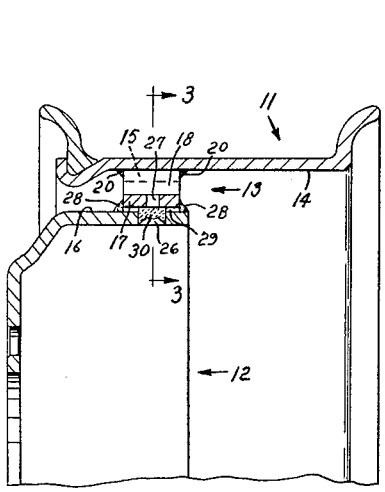
Fig. 2 is a fragmental vertical sectional view of the wheel of Fig. 1 as seen along the line 2—2 of Fig. 1.
Figure 3:
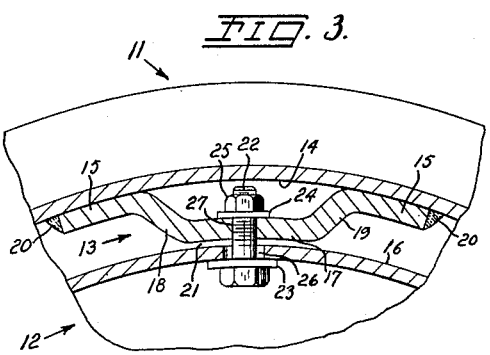
Fig. 3 is an enlarged fragmental vertical sectional view of the wheel of Fig. 1 as seen along the line 3—3 of Fig. 2.

In the assembly of the rim structure 11 to the hub structure 12 by the spoke structures 13, the flanges 15 of spoke structures 13 are first welded to the inner surface 14 of rim structure 11 as shown at 20 in Figs. 2 and 3. Spoke structures 13 are of such dimensions that when welded to rim structure 11 and otherwise unstressed each of their center sections 17 will be radially separated from the outer surface 16 of hub structure 12 by a radial gap 21 as shown in Fig. 3.

To proceed with the assembly of the wheel, as shown in Fig. 3 at each of the spoke structures 13 a bolt 22 with washers 23, 24 and nut 25 is assembled through hole 26 in hub structure 12 and hole 27 in rim structure 11. Then bolts 22 of all of the hub structures 13 are turned into their respective nuts 25 until cylindrical surface 16 of hub structure 12 is gaged to be round and air gap 21 is shortened as required to give bolts 22 the desired tension stress. Next between center sections 17 of spoke structures 13 and surface 16 of hub structure 12 welding rod is electrically applied as shown at 28 across gap 21. As the weld metal 28 across gap 21 cools it draws center sections 17 of spoke structures 13 closer to surface 16 of hub structure 12 to shorten gap 21 radially as shown at 29 in Fig. 2 and thus puts spokes 18, 19 of spoke structures 13 in sufficient tension so that, all around the wheel, spokes 18, 19 will always be in tension.

While it is true that any change of load on any material will change the shape of the loaded material, it is also true that when steel is worked in tension below its elastic limit its change in length with change in load will not be perceptible to the unaided senses, or will not be "sensible." As the wheel revolves under load, spokes 18, 19 will have different tension loadings at different positions on the wheel but the spokes are preloaded in tension as above constructed so that they will always be in tension when used within the load ratings of the wheels.

When the weld metal 28 has cooled bolts 22 are removed and through larger hole 26 the rim around smaller hole 27 in spoke structure 13 is plug welded at 30 to hub structure 13 as seen in Fig. 2.

The wheel is now completely assembled with the rim structure radially strained toward the hub structure to be concentric therewith by oppositely angled spokes 18 and 19 of the plurality of hub structures 13.

Having recited some of the objects of my invention, illustrated and described a preferred form in which my invention may be practiced and explained the method of construction thereof, I claim:

1. A wheel comprising a hub structure, a rim structure radially spaced from said hub structure and concentric therewith together with a plurality of one piece spoke structures angularly spaced around said hub structure between said hub structure and said rim structure connecting said hub structure with said rim structure, each of said spoke structures including a pair of circumferentially spaced spokes of sufficient width axially of said wheel to prevent relative axial movement of said rim structure with respect to said hub structure, each of said spokes being pre-stressed in tension and of sufficient tensile strength to remain in tension within its elastic limit, one of said each of said pair of spokes being tipped circumferentially in one direction from an intersecting radius of said wheel and the other of said each of said pair of spokes being tipped circumferentially in the other direction from another intersecting radius of said wheel whereby said one of said each of said spokes will prevent any sensible circumferential relative movement of said rim structure with respect to said hub structure in one direction and the other of said each of said spokes will prevent any sensible circumferential relative movement of said rim structure with respect to said hub structure in the other direction.

2. A wheel comprising a hub structure, a rim structure concentric with and radially spaced about said hub structure and a plurality of circumferentially spaced one piece spoke structures each connecting said rim structure with said hub structure across the radial space therebetween, each of said spoke structures including a pair of circumferentially spaced spokes with one of said spokes tipped circumferentially in one direction from an intersecting radius of said wheel and the other of said spokes being tipped circumferentially in the other direction from another intersecting radius of said wheel and each of said spokes being strained in tension between said hub structure and said rim structure at all times when said wheel is being worked within its elastic limit.

3. The wheel of claim 2 in which each of said spoke structures is formed of a single metal bar substantially rectangular in cross section with its longest sectional sides substantially parallel to the axis of said wheel, said spoke structure having a center section connecting the inner ends of said two spokes and each of said spokes including a respective circumferentially oppositely extending other end flange, said flange ends of said spoke structure being secured to said rim structure and said center section of said spoke structure being secured to said hub structure.

4. A wheel comprising a hub structure, a rim structure concentric with and radially spaced about said hub structure a plurality of circumferentially spaced one piece spoke structures connecting said rim structure to said hub structure across the radial space therebetween, one of said spoke structures comprising a metal bar substantially rectangular in section with its longitudinal centerline in a plane perpendicular to the axis of said wheel and the longer edges of any cross section thereof parallel to said axis, said spoke structure having a center section secured to said hub structure and a pair of end sections secured to said rim structure, one of said end sections being connected to one end of said center section by a spoke tipped in one direction from an intersecting radius of said wheel and the other of said end section by a spoke tipped in the other direction from an intersecting radius of said wheel and each of said spokes being strained in tension between said hub structure and said rim structure at all times when said wheel is being worked within its elastic limit.

References Cited in the file of this patent

UNITED STATES PATENTS

| | | |
|---|---|---|
| 432,848 | Wood | July 22, 1890 |
| 897,701 | Baker | Sept. 1, 1908 |
| 1,247,591 | Staser | Nov. 20, 1917 |
| 1,571,251 | Fairley | Feb. 2, 1926 |
| 2,522,710 | Gilbert | Sept. 19, 1950 |
| 2,761,485 | Allen | Sept. 4, 1956 |